Jan. 2, 1923.
T. H. THOMAS.
ELECTROPNEUMATIC BRAKE.
FILED APR. 2, 1920.
1,440,421
3 SHEETS-SHEET 2
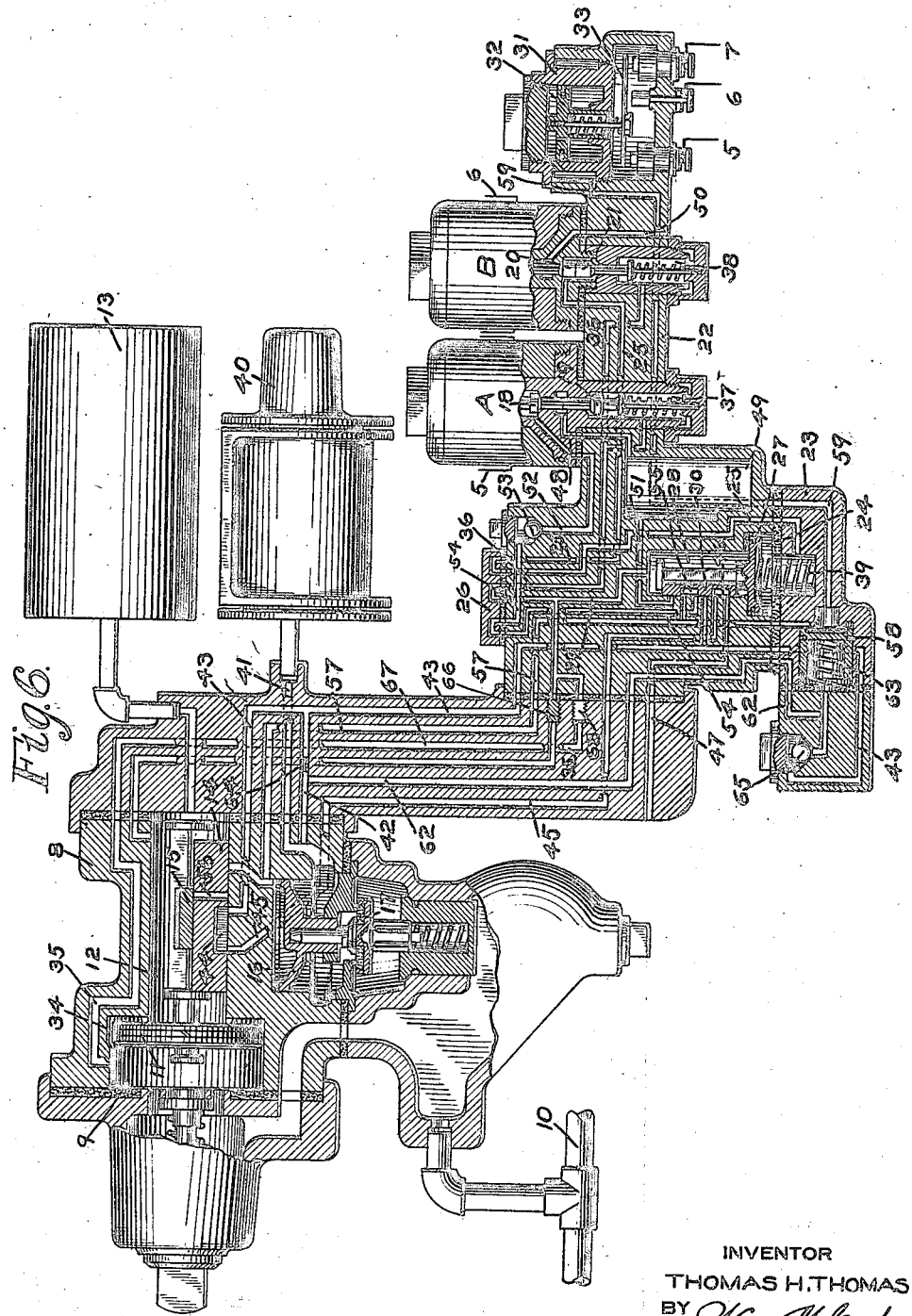
INVENTOR
THOMAS H. THOMAS
BY Wm. M. Cady
ATTORNEY

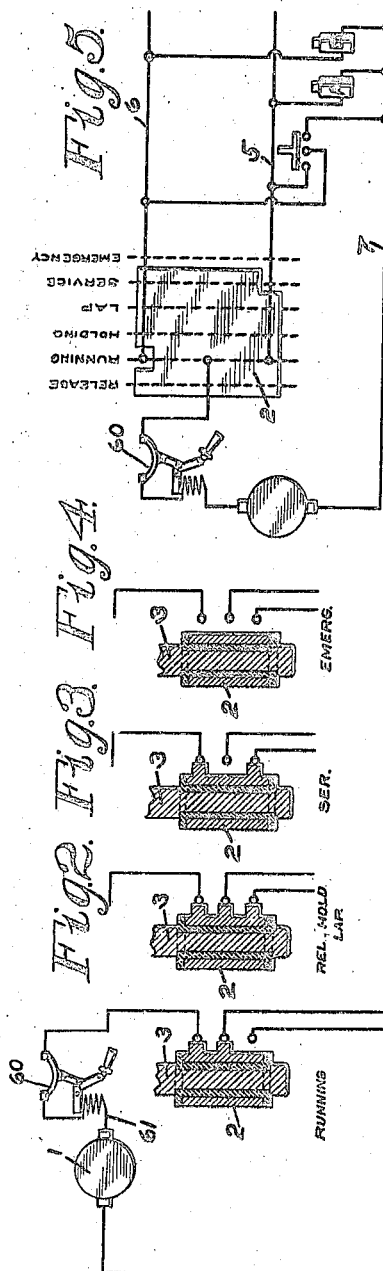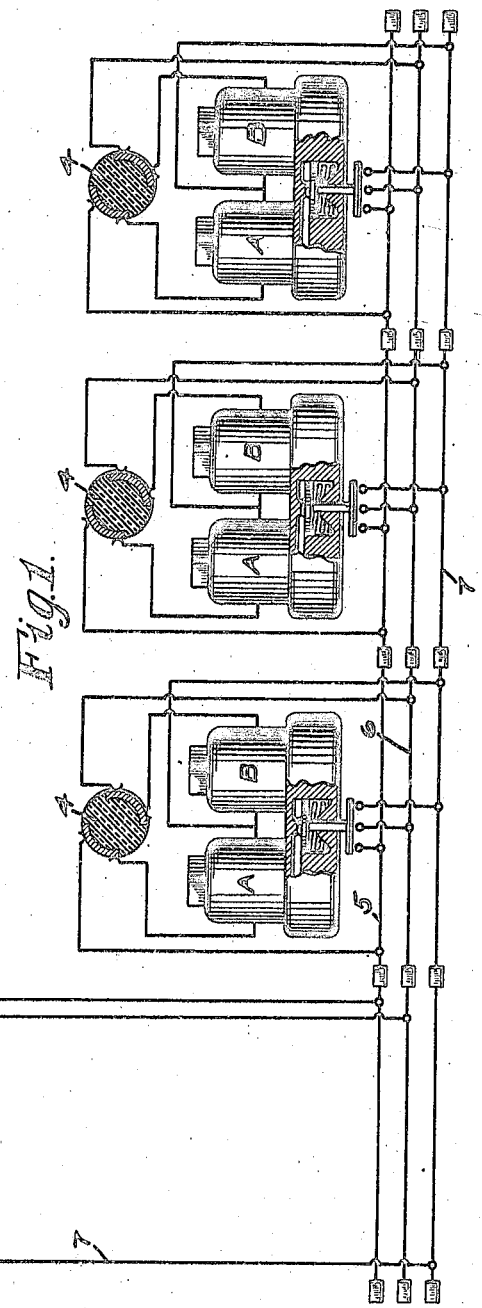

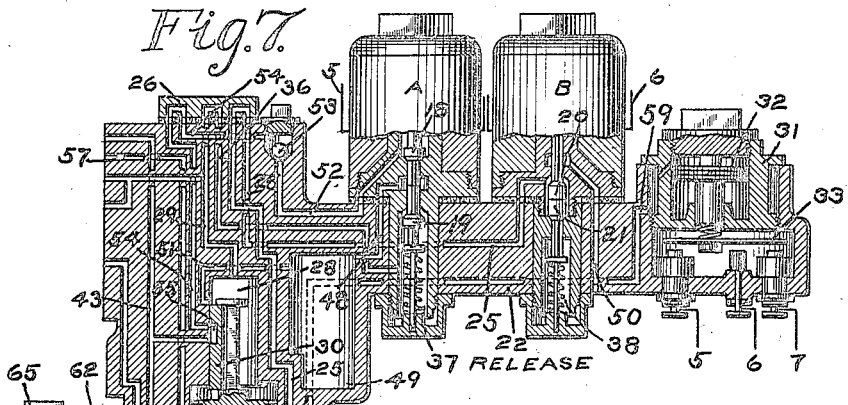
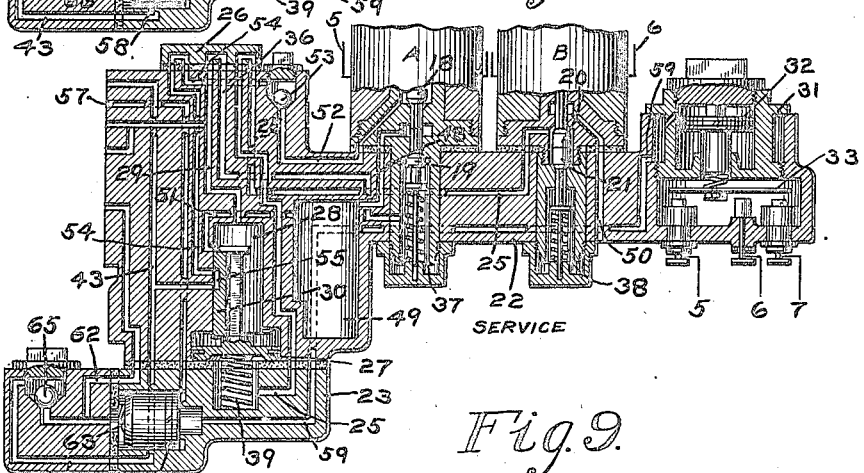
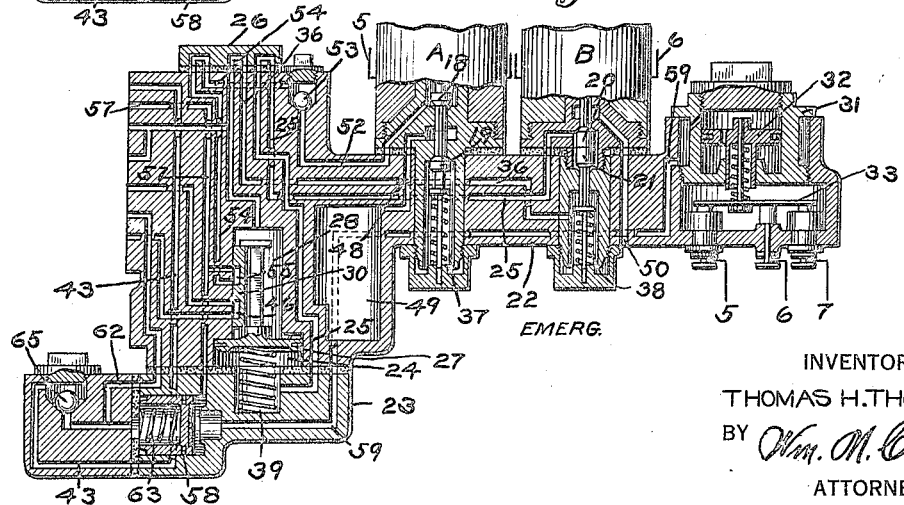

Patented Jan. 2, 1923.

1,440,421

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed April 2, 1920. Serial No. 370,667.

*To all whom it may concern:*

Be it known that I, THOMAS H. THOMAS, a citizen of the United States, residing at Edgewood, in the county of Allegheny and State of Pennsylvania, have invented new and useful Improvements in Electropneumatic Brakes, of which the following is a specification.

This invention relates to electro-pneumatic brakes, and more particularly to a brake equipment for electrically controlling the brakes on the cars of a train.

The principal object of my invention is to provide an improved electro-pneumatic brake equipment in which a reduced number of electric train wires and brake control magnets are employed.

Other objects and advantages will appear in the following more detailed description of the invention.

In the accompanying drawings; Fig. 1 is a diagrammatic view of an electro-pneumatic brake equipment for a locomotive or head car and other cars of a train, with my invention applied thereto; Figs. 2 to 4 inclusive, sectional views of the brake switch drum, showing the electric train line connections in the respective positions indicated on the drawings; Fig. 5 a wiring diagram, including a development of the electric brake drum; Fig. 6 a sectional diagrammatic view of a car electro-pneumatic brake equipment embodying my invention; and Figs. 7 to 9 inclusive, sectional views of the electric portion of the mechanism shown in Fig. 6, in the respective positions of release, service, and emergency.

As shown in Fig. 1 of the drawing, an electric generator 1 is provided on the locomotive and a brake switch comprising a contact drum 2 adapted to be operated by a stem 3 which is preferably connected to the usual brake valve device, so that the movement of the brake valve for controlling the brakes pneumatically also moves the brake drum for controlling the brakes electrically.

On each car of the train, there is provided electro-magnets A and B for controlling a valve mechanism by which the brakes may be applied and released.

One terminal of the magnet A is connected through a cut-out switch 4 to an electric train wire 5 and one terminal of magnet B is connected to an electric train wire 6, the other terminal of said magnets being connected to a return train wire 7.

While the car electro-pneumatic brake equipment is designed to operate in connection with various forms of brake controlling valve devices, I have shown one application in Fig. 6 of the drawings in which the electro-pneumatic apparatus is applied in connection with a standard quick action triple valve device 8.

Said triple valve device may comprise the usual casing, having a piston chamber 9 connected to the brake pipe 10 and containing piston 11 and a valve chamber 12, connected to an auxiliary reservoir 13 and containing a main slide valve 14 and a graduating slide valve 15 adapted to be operated by piston 11.

The quick action portion of the triple valve device may comprise the usual piston 16 for operating a train pipe vent valve 17.

The magnet A is adapted to operate valves 18 and 19 and the magnet B valves 20 and 21. Associated with the magnet bracket 22 is a selector valve device 23 having a piston chamber 24 connected to a passage 25, leading through a cut-out cap 26 and controlled by valve 20, and containing a piston 27 and having a valve chamber 28, connected to a passage 29 and containing a slide valve 30, adapted to be operated by piston 27.

Also associated with the magnet bracket 22 is a short circuiting switch device 31 having a piston 32 for operating a switch contact 33, adapted when closed to connect the electric train wires 5, 6, and 7.

In operation, the fluid pressure brake system is charged in the usual manner and fluid from the brake pipe 10 flows to piston chamber 9 of the triple valve device 8 and thence through feed groove 34 to valve chamber 12 and the auxiliary reservoir 13.

In the normal running position of the brake valve and brake switch, the magnet A is energized while the magnet B is deenergized, as shown in Fig. 6 of the drawings. Fluid under pressure is supplied from the brake pipe through passage 35 to passage 29, charging the valve chamber 28 of the selector valve device 23.

Fluid also flows from passage 35 through the cap 26 to a passage 36 which leads to the chamber 37 below the magnet valve 19 and also chamber 38 below the magnet valve 21.

With the magnet B deenergized, the valve 20 will be seated and the valve 21 opened, so as to permit fluid from the brake pipe to flow from passage 36 and chamber 38, past the valve 21 to passage 25. The fluid pressures on opposite sides of the piston 27 being thus equalized, the spring 39 maintains piston 27 and slide valve 30 in release position, as shown in Fig. 6.

In this position, the brake cylinder 40 is connected to the atmosphere through passage 41, passage 42, passage 43, cavity 44 in slide valve 14 of the triple valve device, passage 45, cavity 46 in slide valve 30, and exhaust port 47.

The magnet A being energized in running position, the valve 18 will be seated and the valve 19 will be held open so that fluid under pressure is supplied from the brake pipe through passage 36 and chamber 37, past the valve 19 to passage 48 and thence to an emergency valve chamber 49, the purpose of which will be hereinafter explained.

If it is desired to effect a service application of the brakes, the combined brake valve and brake switch is turned to service application position, in which the brake pipe pressure is reduced through the brake valve in the usual manner, and the magnet A is deenergized, while the magnet B is energized.

The energization of magnet B causes the valve 21 to be closed and the valve 20 to be opened, so that passage 25 is connected to an atmospheric exhaust port 50. Fluid under pressure is therefore vented from piston chamber 24 of the selector valve device 23 and consequently the piston 27 and slide valve 30 are shifted to the position shown in Fig. 8 of the drawings.

In this position, the brake pipe is vented to the brake cylinder 40 in the following manner; through passage 35 to passage 29 and valve chamber 28 of the selector valve device 23 and thence through passage 51 to emergency chamber 49, through passage 48, past the valve 18 to passage 52, past check valve 53 to passage 54 and through cap 26 and cavity 55 in slide valve 30 to passage 43, which leads to the brake cylinder 40.

The brake pipe pressure is therefore locally reduced on each car of the train as above described, by the operation of the electric portion and is also reduced at the brake valve; so that the triple valve devices on the train are shifted to service application position, in which the usual service port 56 in slide valve 14 registers with brake cylinder port 43 and fluid under pressure is supplied from the valve chamber 12 and the auxiliary reservoir 13 to the brake cylinder 40 in the usual manner.

The brakes may be released by first moving the brake valve to release position and then to running position. In release position, fluid is supplied from the main reservoir through the brake valve to the brake pipe in the usual manner to secure a rapid increase in brake pipe pressure throughout the train and thereby effect the movement of the triple valve devices to release position.

In release position, the brake switch operates to energize both the magnets A and B. Since the magnet B remains energized, as in service application position, the piston chamber 24 of the selector valve device 23 is maintained at atmospheric pressure and the piston 27 and slide valve 30 remain in service position, as shown in Fig. 7 of the drawing.

The venting of fluid from the brake pipe to the brake cylinder is cut off however, since the magnet A is energized to close the valve 18 and thus cut off communication through which fluid is supplied from the brake pipe to the brake cylinder.

When the brake pipe pressure has been increased in the release position of the brake valve sufficiently to effect the movement of the triple valves to release position, the brake valve may be turned to running position, in which the brake switch operates to energize the magnet A and deenergize the magnet B.

The deenergization of magnet B causes the valve 20 to be closed and the valve 21 opened, so that fluid under pressure is supplied from the brake pipe through passage 36, past valve 21 to passage 25 and piston chamber 24. The piston 27 and slide valve 30 of the selector valve device are then shifted to release position, in which the brake cylinder is connected to the exhaust port 47, as hereinbefore described.

If the brake valve is left in running position the brakes will be fully released, but if it is desired to effect a graduated release of the brakes, the brake valve may be moved from running to release position, after the brake cylinder pressure has been partially reduced, so as to cut off the further exhaust of fluid from the brake cylinder.

Further reductions in brake cylinder pressure may be effected, as will be evident, by moving the brake valve between running and release positions as often as desired.

An emergency application of the brakes may be effected by moving the brake valve to emergency position in which the brake pipe pressure is suddenly reduced at the brake valve and in which all the electric brake circuits are opened, so that both the magnets A and B are deenergized.

Since the magnet B is deenergized, the piston 27 of the selector valve device 23 will be maintained in release position, the supply of fluid under pressure to the piston chamber 24 being maintained past the open valve 21.

The magnet A being deenergized, the valve 19 will be closed and the valve 18 opened, so that fluid under pressure is supplied from the normally charged emergency chamber 49 to the quick action piston 16, through passage 48, past the valve 18, through passage 52, past check valve 53, through passage 54 and cavity 55 in selector slide valve 30 to passage 57 and thence to the quick action piston 16.

Said piston then operates to open the brake pipe vent valve 17 and vent fluid from the brake pipe to effect a local reduction in brake pipe pressure in the usual manner.

Fluid under pressure is also supplied through passage 57 to the outer seated area of a valve piston 58, which is thereby opened, so as to permit fluid under pressure to flow through a passage 59 to the switch piston 32. Said switch piston then operates the switch bar 33 to bridge the contacts connected to the train wires 5, 6, and 7.

Where an emergency application of the brakes is initiated by movement of the brake valve to emergency position, as above described, the bridging of the contacts by the switch bar 33 will have no effect, since the train line circuits are all open at the brake valve, but in case an emergency application of the brakes is initiated by a train break-in-two or because of a bursted brake pipe hose, the quick action piston of the triple valve device on the forward portion of the train, adjacent to the break, will be operated by the sudden reduction in brake pipe pressure, so that fluid is supplied to the corresponding switch piston 32 by the opening of the valve piston 58 and under these conditions, the brake valve will probably be in a position other than the emergency position, and therefore a circuit will be closed through one or more of the train wires 5, 6, and 7, so that the bridging of the contacts connected to said train wires by the closure of switch bar 33 will cause a short circuit through the energized train wires and thereby a sudden rush of current through the overload switch device 60 in the current supply lead 61. The overload switch will then be operated in the usual way to open the generator circuit, so that all of the train wires will be deenergized and consequently an emergency application of the brakes will be produced on the cars at the head end of the train to the point where the break-in-two has occurred.

Brake cylinder pressure is supplied to the spring side of the valve piston 58 through passage 62, so that when the brake cylinder pressure plus the pressure of spring 63 slightly exceeds the auxiliary reservoir pressure acting on the opposite side of the valve piston, said valve piston will be moved to its seat, closing communication from the auxiliary reservoir to the switch piston 32, permitting the piston 32 to return the switch 33 to its open position, and thus restoring the electric train lines to normal, for further electric operation.

If a car equipped with the above described apparatus is placed in the train not provided with electric control, the magnets A and B will both be deenergized, so that the valve 19 will be seated, cutting off the supply of fluid from the brake pipe to the emergency chamber 49 while the valve 18 will be opened, and fluid in said chamber will be vented to the chamber above the quick action piston 16.

Since there is no fluid pressure in the chamber 49 under the above conditions, there will be no action of the electric portion and the equipment of the train will act only pneumatically in the usual manner.

A choke 64 in the passage 42 ensures that the brake pipe pressure will not reduce faster than the auxiliary reservoir pressure in an electric service application of the brakes, since the brake pipe pressure as well as fluid from the auxiliary reservoir must flow through the choke to get to the brake cylinder and this prevents the possibility of the triple valve device shifting to emergency position by the reduction in brake pipe pressure which is effected in an electric service application of the brakes.

In order that the release of the brakes may not be restricted by flow through the choke 64, the release of fluid from the brake cylinder is augmented through a by-pass, containing a check valve 65, from the passage 62 to the passage 43.

As hereinbefore described, the apparatus operates both electrically and pneumatically, that is to say, the brake pipe pressure is reduced in electric operation, and the triple valve devices operate by the reduction in brake pipe pressure to supply fluid to the brake cylinder.

If it is desired to operate electrically only, without having the triple valve devices function, a plug 66 in a passage 67 leading from the valve chamber 12 to the passage 29 is removed and placed in the threaded opening 68 in the passage 35, so as to close the brake pipe passage 35 and open the auxiliary reservoir passage 67.

With this arrangement, it will be seen that upon operation of the electric portion, fluid under pressure will be taken from the auxiliary reservoir instead of the brake pipe in making an application of the brakes. In this case the electric positions of the brake valve are separate from the pneumatic positions, so that no reduction in brake pipe pressure is effected in the electric service position.

While in making an electric service application of the brakes, the auxiliary reservoir pressure tends to be reduced, the pressure in the auxiliary reservoir will be substantially maintained by flow from the brake pipe through the usual feed groove 34 around the triple valve piston 11.

Having now described my invention, what I claim as new and desire to secure by Letters Patent, is:—

1. In an electro-pneumatic brake, the combination with a valve mechanism operated by variations in fluid pressure for controlling the application and release of the brakes, of two electro-magnets and double beat valves operated by each magnet for controlling the fluid pressure variations.

2. In an electro-pneumatic brake, the combination with a valve mechanism operated by variations in fluid pressure for controlling the application and release of the brakes, of two electro-magnets and two valves operated by each magnet, one adapted to seat upon energization and the other upon deenergization of the cooperating magnet for controlling said variations in fluid pressure.

3. In an electro-pneumatic brake, the combination with two electro-magnets, of means controlled by said magnets for effecting an application of the brakes upon energization of one magnet, the release of the brakes upon energization of the other magnet, and holding the brakes applied upon energization of both magnets.

4. In an electro-pneumatic brake, the combination with two electro-magnets, of means controlled by said magnets for effecting a service application of the brakes upon energization of one magnet, the release of the brakes upon energization of the other magnet, the holding of the brakes applied upon energization of both magnets, and an emergency application of the brakes upon deenergization of both magnets.

5. In an electro-pneumatic brake, the combination with two electro-magnets, of means controlled by said magnets for effecting a service application of the brakes upon energization of one magnet, the release of the brakes upon energization of the other magnet, and an emergency application of the brakes upon deenergization of both magnets.

6. In an electro-pneumatic brake, the combination with a selector valve device, of electrically controlled means for effecting a service application of the brakes with the selector valve device in one position and an emergency application of the brakes with the selector valve device in another position and electrically controlled means for effecting the operation of said selector valve device.

7. In an electro-pneumatic brake, the combination with a selector valve device having one position in which communication is established for effecting a service application of the brakes and another position in which communication is established for effecting an emergency application of the brakes, of electrically controlled means for initiating a service or an emergency application of the brakes through said selector valve device and electrically controlled means for effecting the operation of said selector valve device.

8. In an electro-pneumatic brake, the combination with a selector valve device adapted to control the release of the brakes and having one position in which communication is established for effecting a service application of the brakes and another position in which communication is established for effecting an emergency application of the brakes, of electrically controlled means for initiating a service or an emergency application of the brakes through said selector valve device and electrically controlled means for effecting the operation of said selector valve device.

9. In an electro-pneumatic brake, the combination with a selector valve device having one position for establishing communication for effecting a service application of the brakes and another position for establishing communication for effecting an emergency application of the brakes, of electrically controlled means for effecting the operation of said selector valve device.

10. In an electro-pneumatic brake, the combination with two electro-magnets and means controlled by said magnets for effecting a service application of the brakes, an emergency application of the brakes, and the release of the brakes, of a train wire through which each magnet may be energized and a common return for said magnets.

11. In an electro-pneumatic brake, the combination with two electro-magnets and means controlled by said magnets for effecting a service application of the brakes, an emergency application of the brakes, the holding of the brakes applied, and the release of the brakes, of a train wire for each magnet through which current is supplied for energizing the corresponding magnet and a common return wire for both magnets.

12. In an electro-pneumatic brake, the combination with a valve device operated by fluid under pressure for effecting an emergency application of the brakes, of an emergency chamber and electrically controlled means adapted upon energization to charge said chamber with fluid under pressure and upon deenergization to connect said chamber with said valve device.

13. In an electro-pneumatic brake, the combination with a brake pipe and a quick action valve device operated by fluid under pressure for venting fluid from the brake pipe to effect an emergency application of the brakes, of an emergency chamber and electrically controlled means adapted when energized to charge said chamber with fluid under pressure and upon deenergization to vent same to said quick action valve device.

14. In an electro-pneumatic brake, the combination with a brake pipe, auxiliary reservoir, and brake cylinder, of electrically controlled means for controlling a passage through which fluid is vented from the brake pipe to effect an application of the brakes and a passage through which fluid from the auxiliary reservoir is supplied to effect an application of the brakes and means for closing communication through one passage when the other passage is open.

15. In an electro-pneumatic brake, the combination with a brake pipe, auxiliary reservoir, and brake cylinder, of a valve device operated upon a reduction in brake pipe pressure for supplying fluid from the auxiliary reservoir to the brake cylinder and electrically controlled means for controlling a passage through which fluid is vented from the brake pipe and a passage through which fluid is supplied from the auxiliary reservoir directly to the brake cylinder and means for closing one passage when the other passage is used.

16. In an electro-pneumatic brake, the combination with a brake pipe, of two electro-magnets, means operated upon deenergization of both magnets for effecting an emergency application of the brakes, a train wire for each magnet through which the corresponding magnet is energized, a common return wire, an overload circuit breaker in the electric supply circuit for said train wires, and a switch device operated upon a reduction in brake pipe pressure for establishing a short circuit from the supply train wires to the return wire.

17. In an electro-pneumatic brake, the combination with two train wires, of means operative upon energization of one train wire to effect an application of the brakes, upon energization of the other train wire to effect the release of the brakes, and upon energization of both train wires to hold the brakes applied.

18. In an electro-pneumatic brake, the combination with two train wires, of means operative upon energization of one train wire to effect an application of the brakes, upon energization of the other train wire to effect the release of the brakes, upon energization of both train wires to hold the brakes applied, and upon deenergization of both train wires to effect an emergency application of the brakes.

19. In an electro-pneumatic brake, the combination with two brake magnets, of means operative upon energization of one magnet and the deenergization of the other magnet for effecting a service application of the brakes and upon deenergization of both magnets for effecting an emergency application of the brakes.

20. In an electro-pneumatic brake, the combination with two brake magnets, of means operative upon energization of one magnet and the deenergization of the other magnet for effecting the release of the brakes and upon deenergization of both magnets for effecting an emergency application of the brakes.

21. In an electro-pneumatic brake, the combination with a chamber normally charged with fluid under pressure, of a valve device operated by fluid supplied from said chamber for effecting an application of the brakes and electrically controlled means for controlling the supply of fluid from said chamber to said valve device.

22. In an electro-pneumatic brake, the combination with a chamber normally charged with fluid under pressure, of a valve device operated by fluid supplied from said chamber for effecting an application of the brakes and normally energized electrically controlled means operative upon deenergization for supplying fluid from said chamber to said valve device.

23. In an electro-pneumatic brake, the combination with a valve device having a normal position and movable to a position for effecting an application of the brakes, of electrically controlled means operative upon deenergization for effecting the operation of said valve device and means for effecting the movement of said valve device to normal position after a predetermined time to permit the release of the brakes.

24. In an electro-pneumatic brake, the combination with a chamber normally charged with fluid under pressure and a valve device operated by fluid supplied from said chamber for effecting an application of the brakes, of electrically controlled means for controlling the supply of fluid from said chamber to said valve device and means for slowly venting fluid from said chamber to permit a return movement of said valve device and the release of the brakes after a predetermined time interval.

25. In an electro-pneumatic brake, the combination with a valve device for effecting an application of the brakes, of electrically controlled means operative upon deenergization for effecting the operation of said valve device and means operative to permit the release of the brakes after a predetermined time interval.

26. In an electro-pneumatic brake, the combination with a brake cylinder and a fluid pressure operated valve device for controlling the release of fluid under pressure from said brake cylinder, of an additional valve device for controlling the release of fluid from the brake cylinder through said fluid pressure operated valve device and electrically controlled means for effecting the operation of said additional valve device.

27. In an electro-pneumatic brake, the combination with a brake cylinder and a valve device for controlling the exhaust of fluid from the brake cylinder and communication through which fluid under pressure is supplied to the brake cylinder, of electrically controlled means for controlling the supply of fluid from said communication to the brake cylinder.

28. In an electro-pneumatic brake, the combination with a brake cylinder and a valve device for controlling the exhaust of fluid from the brake cylinder and communication through which fluid under pressure is supplied to the brake cylinder, of electrically controlled means for effecting the operation of said valve device to close the brake cylinder exhaust and open said communication and electrically controlled means for supplying fluid from said communication to the brake cylinder.

29. In an electro-pneumatic brake, the combination with a brake pipe, a valve device operated upon a reduction in brake pipe pressure for effecting an application of the brakes, and a valve mechanism operated by an increase in fluid pressure for venting fluid from the brake pipe, of a selector valve device having a position for establishing communication through which fluid is supplied to said valve mechanism and a position in which communication is established for venting fluid from the brake pipe, and electrically controlled means for controlling the operation of said selector valve device.

30. In an electro-pneumatic brake, the combination with a brake pipe, auxiliary reservoir, and brake cylinder, of electrically controlled means for first supplying fluid from the brake pipe to the brake cylinder and then from the auxiliary reservoir and means operated upon a reduction in brake pipe pressure for establishing communication through which said electrically controlled means supplies fluid from the auxiliary reservoir to the brake cylinder.

31. In an electro-pneumatic brake, the combination with a valve mechanism operative to effect an application of the brakes, of electrically controlled means operative upon deenergization for effecting the operation of said valve mechanism and means operative upon energization of said electrically controlled means for rendering said electrically controlled means effective upon deenergization to cause the operation of said valve mechanism.

32. In an electro-pneumatic brake, the combination with a valve mechanism operated by fluid under pressure for effecting an application of the brakes, of a chamber and electrically controlled means adapted upon energization to effect the charging of said chamber with fluid under pressure and upon deenergization to supply fluid from said chamber to said valve mechanism.

In testimony whereof I have hereunto set my hand.

THOMAS H. THOMAS.